(No Model.)
G. GIBSON.
NUT LOCK.
No. 510,683. Patented Dec. 12, 1893.
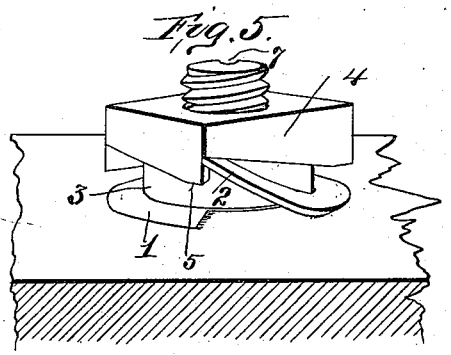
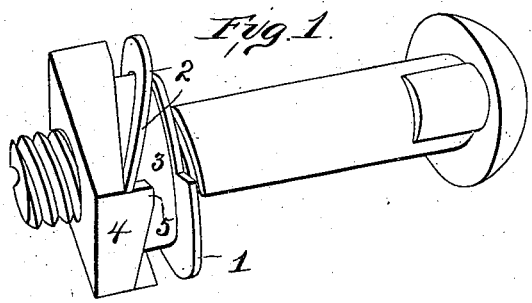
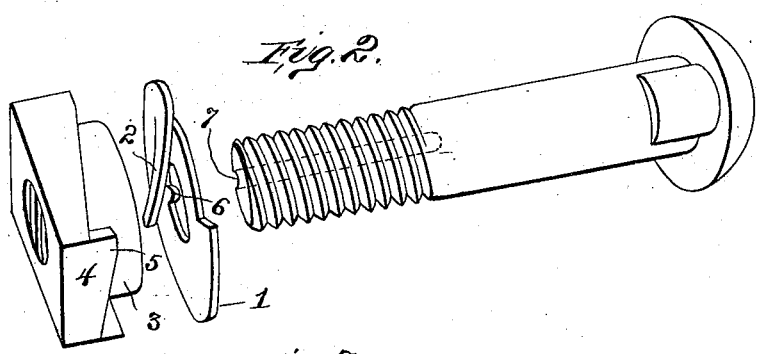
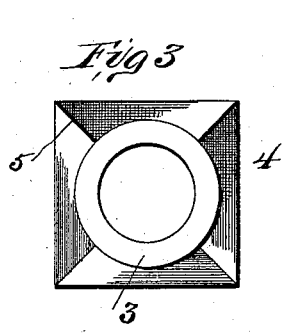
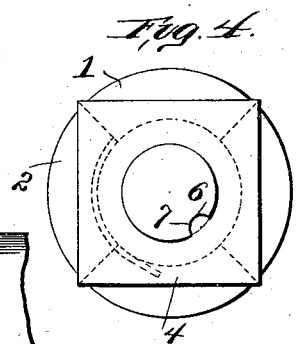
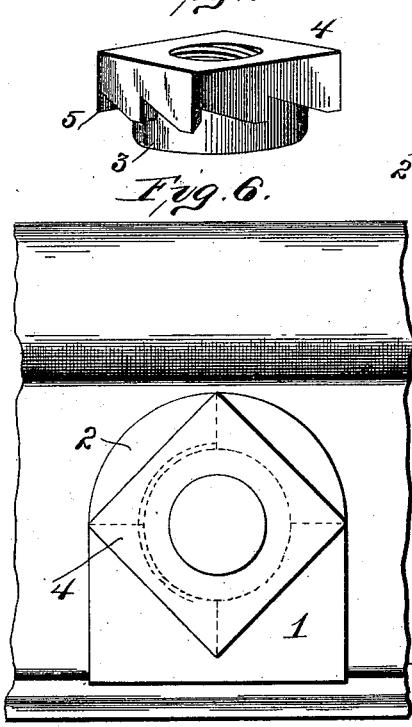
Attest:
J. Percy Carr.
Inventor
Gerold Gibson,
By James A. Carr,
Atty.
THE NATIONAL LITHOGRAPHING COMPANY,
WASHINGTON, D. C.

UNITED STATES PATENT OFFICE.

GEROLT GIBSON, OF ST. LOUIS, MISSOURI.

NUT-LOCK.

SPECIFICATION forming part of Letters Patent No. 510,683, dated December 12, 1893.

Application filed June 1, 1893. Serial No. 476,246. (No model.)

*To all whom it may concern:*

Be it known that I, GEROLT GIBSON, a citizen of the United States, residing in the city of St. Louis and State of Missouri, have invented certain new and useful Improvements in Nut-Locks, of which the following is a specification.

My invention relates to nut-locks, and has for its principal objects to provide for unlocking and tightening a nut, especially when the washer has become partially embedded in the wood, or when dirt has accumulated under the spring detent, to relieve the locking device from strain when in actual use and to attain certain practical advantages of construction hereinafter disclosed.

My invention consists principally in arranging and adapting the parts so that an open space will intervene between the portion of the nut with which the locking device co-operates and the washer or other piece against which the body of the nut abuts.

My invention also consists in the parts and in the combinations of parts hereinafter described and claimed.

In the accompanying drawings, which form part of this specification, Figure 1 is a perspective view showing the nut and washer applied to a bolt. Fig. 2 is a perspective view of the several parts. Fig. 3 is a plan of the under face of the nut. Fig. 4 is a plan of the upper face of the nut and washer. Fig. 5 is a perspective view similar to Fig. 1, showing the washer embedded in the wood; and Fig. 6 is an elevation showing a modification of the washer.

A plate or washer, 1, provided with the ordinary bolt-hole, has a tongue, 2, thereon. This tongue, 2, which is more or less resilient, is punched or struck up from the body of the plate, or washer, its inner edge being preferably approximately concentric with the edge of the bolt-hole and said tongue remaining integral with the plate or washer at one end. The outer edge of the tongue may or may not coincide with the outer edge of the washer; as shown in the drawings, the tongue extends to the edge of the washer, and this is the preferable construction. All the parts of the tongue are far enough from the bolt hole to be out of reach of the hub or ring, 3, hereinafter specified.

The nut, 4, is provided on its under face, through which the bolt hole passes, with a series of cams or inclines, forming, in effect, a series of ratchet teeth, 5. The edge of each tooth is preferably on a diagonal of the face of the nut, as shown in Fig. 3, but, obviously, the teeth may be otherwise arranged, for instance, as shown in Fig. 7. The number of teeth may be varied to suit practical requirements.

The resilient tongue, 2, on the washer, is intended to co-operate with the ratchet teeth, 5, on the nut, but it is important to keep the ratchet teeth separated from the body of the washer. For this purpose, a hub or ring is arranged over the bolt between the nut and the washer. Practically this hub or ring may be simply a loose washer, or perforated plate, or even integral with the washer itself; but in either case, the hub fits on the bolt beneath the ratchet face of said nut; but it is preferable to make it integral with the nut and screw-threaded interiorly in continuation of the thread of the nut. When made integral with the nut, the hub should be made thick enough to accommodate such screw-thread without weakening, and should be annular, to allow the tongue to be located near the center of the washer. The shape and location of the tongue on the washer may be varied considerably, but in order to have it protected by the nut, it is desirable to have it struck up in a curve just beyond the reach of the hub.

The washer is prevented from turning on the bolt by a lug, 6, thereon, which fits in a longitudinal groove, 7, in the bolt. It is desirable also to have the ratchet teeth of the nut cut deep so that the free end of the tongue or spring on the washer may rest normally at a considerable distance from the body of the washer, and also at a sufficient distance from the edge of the tooth to prevent disengagement from said tooth when the bolt has become loose by the compression of the wood.

The device operates as follows: The washer is first placed on the bolt with its lug in the groove of the bolt and with the resilient tongue or spring outermost. Then the hub or ring, if a separate piece, is placed on the bolt, and then the nut is screwed on; or, if the hub is a part of the nut, the two are of course put on together. As the nut is screwed down, the resilient tongue or spring is depressed gradually by an inclined face until the edge of the ratchet tooth passes it, and then it springs up behind said tooth and serves as a detent to prevent backward rotation of the nut. Such operation is repeated for each tooth. When the teeth are located on the diagonal of the nut, the end of the tongue or spring is fully protected under cover of the nut, and only a small segment of the body of the spring is exposed. As the whole tongue or spring is out of reach of the hub, there is nothing to weaken the resiliency of the spring when in use. In order to unlock the nut, the exposed segment of the spring is depressed sufficiently to permit the edge of the ratchet-tooth to clear the free end of the tongue or spring. It is here that the importance of the space between the body of the washer and the ratchet-teeth is most apparent. Rust or dirt is liable to accumulate on the surface beneath the raised spring, and the portion of the wood against which the washer bears is liable to be compressed, whereby the washer becomes partially embedded in the wood, leaving the portion of the wood beneath the spring higher than the compressed portion. In either case, it is impossible to depress the tongue or spring flush with the surface of the washer without first removing a portion of the wood or cleaning away the dirt, as the case may be. Then, too, if the tongue or spring is made by punching, and is not afterward dressed up, it will fit so tight when flush with the body of the washer, that there is danger of its not springing away from it and therefore not acting as it should. In my device, these dangers are avoided because the tongue or spring does not require to be depressed flush with the washer, but just sufficiently to clear the edge of the tooth, so that my device is operative for tightening or unscrewing a nut even where considerable dirt has accumulated; and the accumulated matter is easily accessible to be cleaned out.

Another advantage of my device is that the ratchet-teeth and surface of the nut do not bear against the washer and cut into it, but the hub furnishes a large, flat bearing surface on said washer. Then, too, the spring or tongue may be made of any desired length as the hub does not compress it. Another advantage is that the washer may be made of cheaper material, because only a slight resiliency is required in the tongue or spring, and there is no occasion for resiliency when the device is in actual use, but only while the nut is being turned.

What I claim as new, and desire to secure by Letters Patent, is—

1. The combination of a threaded bolt, a threaded nut having one of its faces through which the bolt-hole passes provided on its diagonals with ratchet teeth, a washer fitting on said bolt and having a curved resilient tongue adapted to cooperate with said ratchet teeth, and a hub of less diameter than the diagonal of said nut, said hub being between said toothed face of the nut and said washer, and bearing against said washer, substantially as described.

2. A threaded nut having a projecting hub around its bolt-hole, which hub bears on a washer the face of said nut from which said hub projects being provided with ratchet-teeth, a washer provided with a bearing surface for said hub around its bolt-hole and also with a tongue, said tongue being located out of the way of said hub, and adapted to cooperate with said ratchet-teeth, substantially as described.

3. A screw-threaded nut having a projecting hub threaded interiorly in continuation of the nut thread, the face of said nut from which said hub projects being provided with ratchet-teeth, and a washer secured to the bolt and having an annular bearing surface upon which surface said hub bears and having also a resilient raised tongue outside of said bearing surface adapted to cooperate with said ratchet-teeth, substantially as described.

4. A threaded nut having a projecting hub threaded interiorly in continuation of the nut thread, the face of said nut from which said hub projects being provided on its diagonals with ratchet-teeth, and a washer having an annular bearing surface upon which said hub bears and having also a curved resilient tongue outside of said bearing surface adapted to cooperate with said ratchet teeth, substantially as described.

5. A threaded nut having one of its faces through which the bolt-hole passes provided on its diagonals with ratchet-teeth, a hub fitting on the bolt beneath the ratchet face of said nut, and a washer having a bearing surface upon which said hub bears, and having also a resilient curved tongue projecting therefrom and cooperating with said ratchet-teeth, the free end of said tongue being located under the corner of said nut while its middle portion projects from under the side of the nut, substantially as described.

GEROLT GIBSON.

Witnesses:
T. PERCY CARR,
JAMES A. CARR.